(12) United States Patent
Fujimori et al.

(10) Patent No.: US 6,356,353 B1
(45) Date of Patent: *Mar. 12, 2002

(54) PRINT CONTROLLER FOR USE WITH AN IMAGE FORMATION DEVICE

(75) Inventors: Toshiro Fujimori, Laguna Beach; Kenneth David Hayber, Huntington Beach; Per-Erik Walberg; Kenneth George Bartlett, both of San Jose; John Randall Christ, Santa Clara; Chao King, Fremont, all of CA (US)

(73) Assignee: Konica Business Technologies, Inc., Windsor, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,250

(22) Filed: Nov. 13, 1997

Related U.S. Application Data

(60) Provisional application No. 60/030,466, filed on Nov. 13, 1996.

(51) Int. Cl.⁷ .................................................. G06F 15/00
(52) U.S. Cl. ...................................... 358/1.13; 358/1.15
(58) Field of Search ................................. 395/114, 115, 395/116, 117; 358/1.14, 1.15, 1.16, 1.17, 1.11, 1.12, 1.13

(56) References Cited

U.S. PATENT DOCUMENTS

| | | | | | |
|---|---|---|---|---|---|
| 5,493,635 A | * | 2/1996 | Brindle et al. | ............... | 395/114 |
| 5,727,135 A | * | 3/1998 | Webb et al. | ................. | 395/113 |
| 5,819,112 A | * | 10/1998 | Kusters | ..................... | 395/856 |
| 5,825,991 A | * | 10/1998 | Plakosh et al. | ............. | 395/115 |
| 5,825,993 A | * | 10/1998 | Shimura et al. | ............ | 395/115 |
| 5,935,262 A | * | 8/1999 | Barrett et al. | ................. | 714/46 |

* cited by examiner

Primary Examiner—Joseph Mancuso
Assistant Examiner—Douglas Tran
(74) Attorney, Agent, or Firm—Cantor Colburn LLP

(57) ABSTRACT

A controller for use with an image formation device. An image formation system includes an image formation device and a controller associated with the image formation device. The image formation device can be operated in either copier mode or printer mode. In printer mode, the controller receives print jobs and forwards the print jobs to the image formation device. The controller converts the print jobs to pixel data and stores the pixel data in memory to buffer the print jobs. The controller also interprets print commands and controls functions performed by the image formation device.

10 Claims, 11 Drawing Sheets

PRINT CONTROLLER FOR USE WITH AN IMAGE FORMATION DEVICE

CROSS-REFERENCES TO RELATED APPLICATIONS

This application claims priority of U.S. Provisional patent application Serial No. 60/030,466, filed Nov. 13, 1996 entitled "Print Controller."

BACKGROUND OF THE INVENTION

1. Field of the Invention

The invention relates to image formation systems and in particular to an image formation system including a controller for enhancing operation of an image formation device.

2. Prior Art

Recently, image formation devices have been designed to serve as both copiers and as printers. This development has eliminated the need for separate copiers and printers that are often found in the same work area. Users can connect their desktop equipment (e.g. personal computers) to the image formation device for printing jobs. To further enhance the system, the image formation device may be connected to a local area network (LAN). While these systems are well suited for their intended purposes, it is recognized in the art that improvements are needed in order to enhance operation of the image formation system. improvements are needed in order to enhance operation of the image formation system.

SUMMARY OF THE INVENTION

The present invention is a method and apparatus for controlling an image formation device. The image formation system includes an image formation device and a controller associated with the image formation device. The image formation device can be operated in either a copier mode or a printer mode. In printer mode, the controller receives print jobs and forwards the print jobs to the image formation device. The controller converts the print jobs to pixel data and stores the pixel data in memory to buffer the print jobs. The controller also interprets print commands and controls functions performed by the image formation device.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
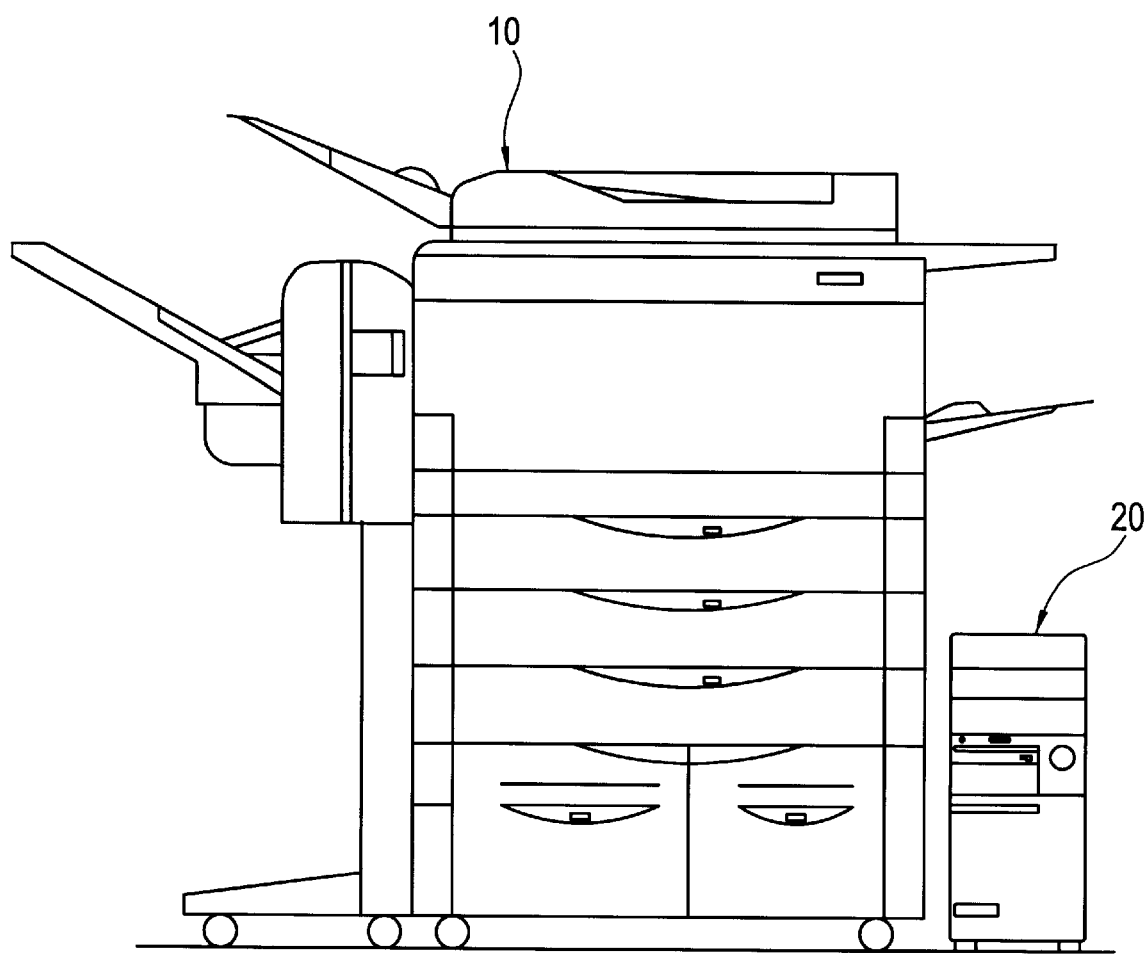
FIG. 1 is a diagrammatic view of the image formation system of the present invention.

FIG. 1 is a diagrammatic view of the image formation system of the present invention. As shown in FIG. 1, the system includes an image formation device shown generally at 10 and a controller shown generally at 20. In an exemplary embodiment, the image formation device 10 is a black and white copier/printer, model 7050 available from Konica Corporation and the controller 20 is an image processor, model IP-201 available from Konica Business Machines. The controller 20 receives data from a variety of sources, as explained in more detail below. The controller 20 provides data to be printed to the image formation device 10 and also controls functions associated with the production of documents by the image formation device 10.

Figure 2:
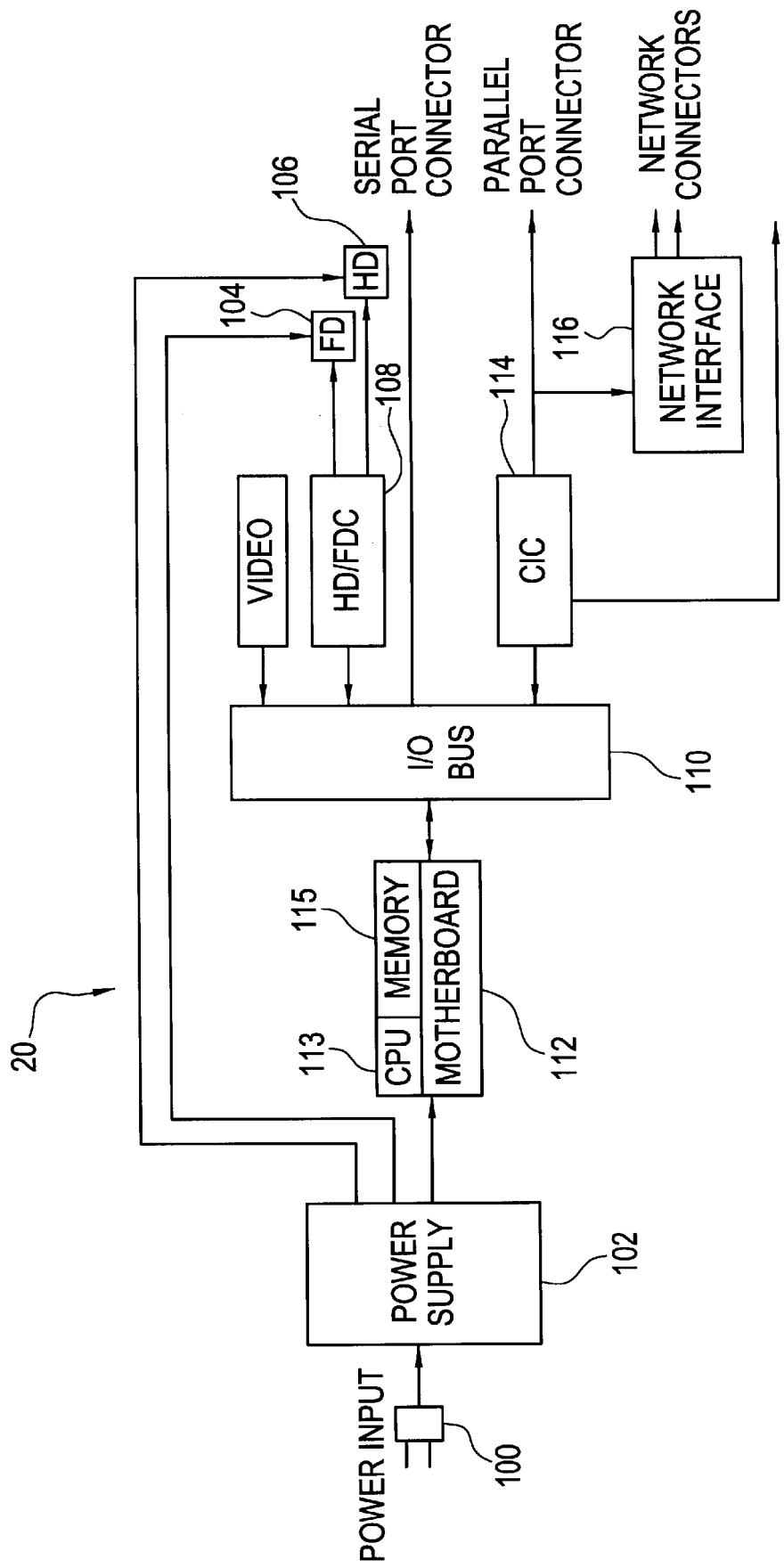
FIG. 2 is a block diagram of the controller.

FIG. 2 is a block diagram of the controller 20. In accordance with an important aspect of the invention, the controller 20 is based on a conventional, open architecture. In an exemplary embodiment, the conventional open architecture is a personal computer (PC) architecture. Using a conventional, open architecture provides several advantages over systems having a product specific architecture such as reduced cost, enhanced performance and reduced time-to-market. The controller 20 includes a power input 100 that is coupled to a power supply 102. The motherboard 112 includes a microprocessor 113 and image memory 115 for storing pixel data prior to printing. A hard drive/floppy drive controller 108 is coupled to the floppy drive 104, the hard drive 106 and an I/O bus 110. The I/O bus 110 is also connected to a serial port connector. A controller interface card 114 is connected to the I/O bus 110 and a parallel port connector. A network interface 116 may also be provided if the image formation system is to be accessed over a network. The network interface 116 and the controller interface card 114 are independent units that are plugged into standard connection slots in the motherboard 112. In an exemplary embodiment, the network interface 116 includes a microprocessor and has network upgradable flash memory to allow easier updating of the software stored on the network interface 116.

The controller interface 114 provides an interface between the controller 20 and image formation device 10. Data and commands are received at the controller 20 through the serial port, parallel port or network interface. Data refers to the information describing what is to be printed. Commands refers to instructions from the user describing how the information is to be printed. Commands such as paper size, duplex mode and stapling are provided to the controller 20 which then produces the proper control signals for the image formation device 10. The control of the image formation device 10 is described in more detail below.

Figure 3:
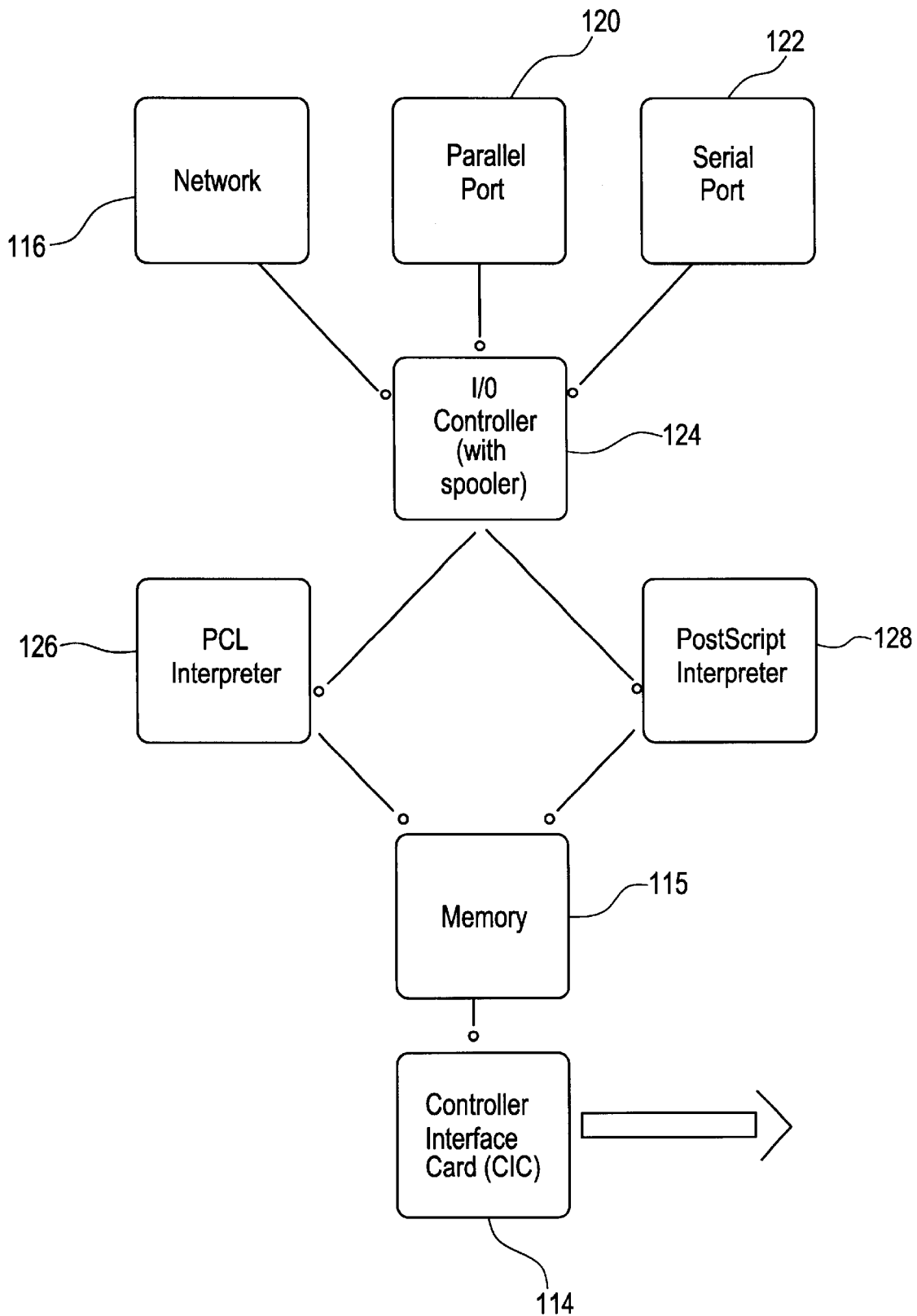
FIG. 3 is a diagram of the flow of data in the controller.
Figure 4:
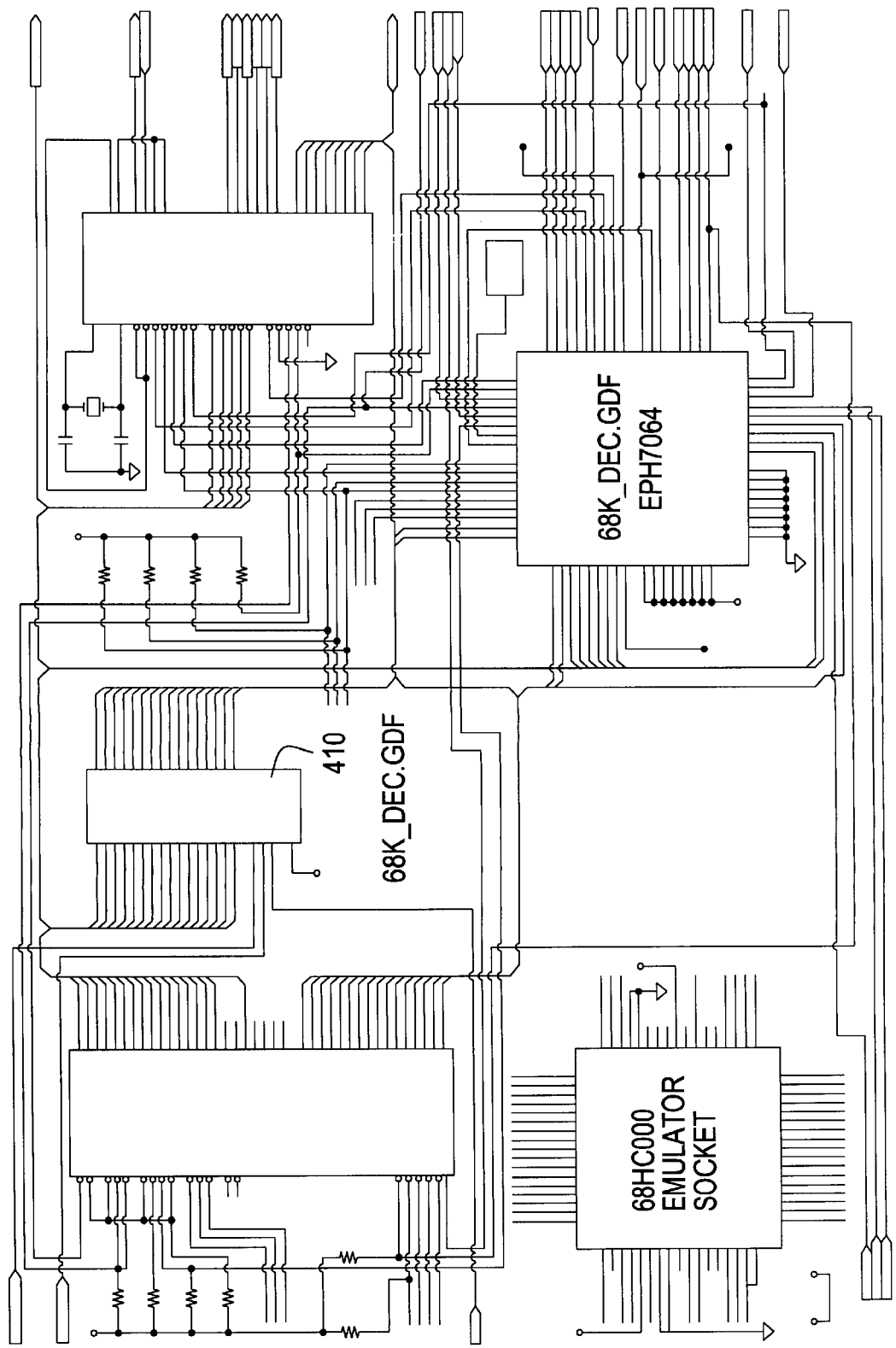
FIGS. 4–11 are schematic diagrams of the controller interface located within the controller.
Figure 5:
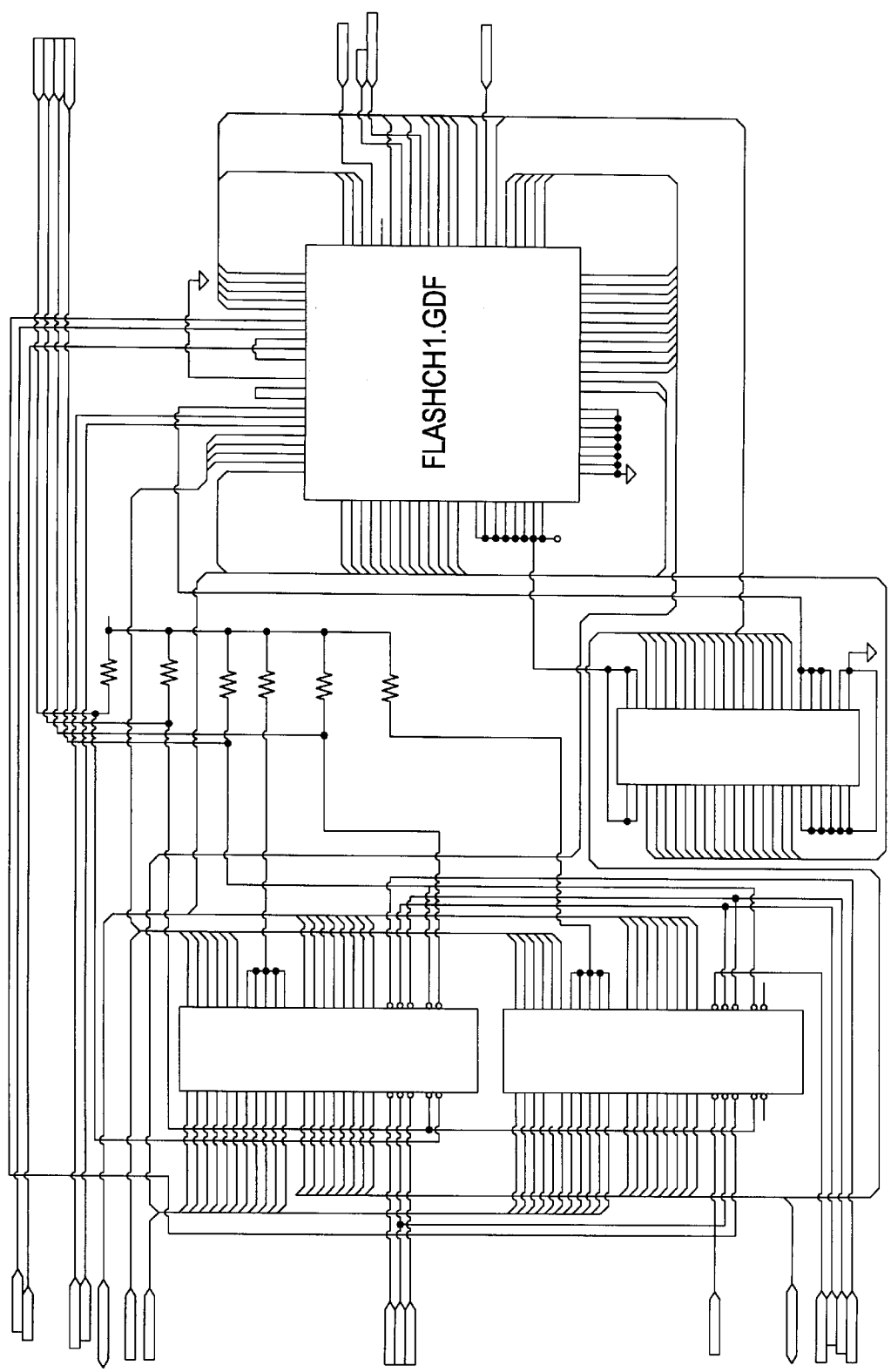
Figure 6:
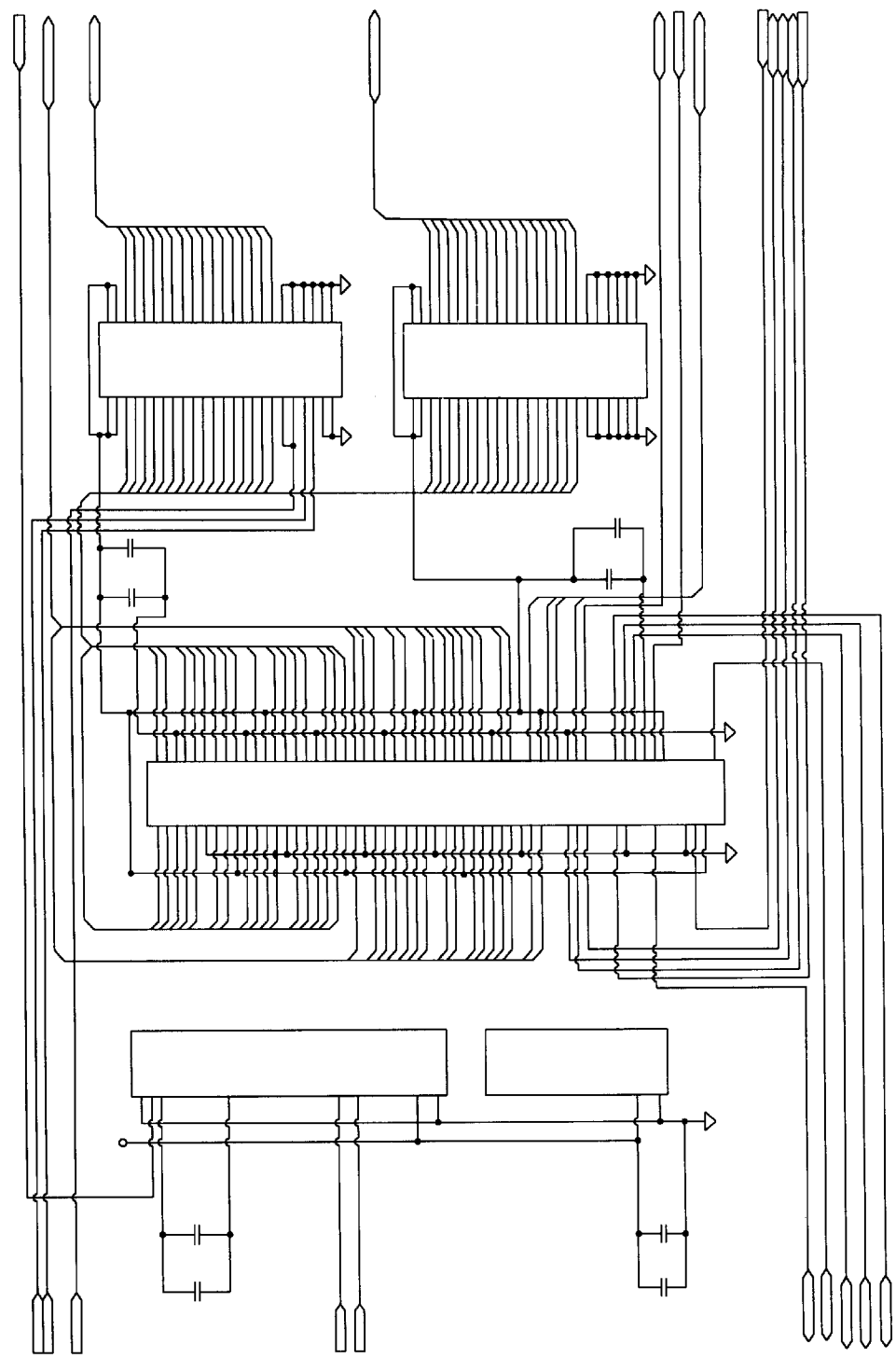
Figure 7:
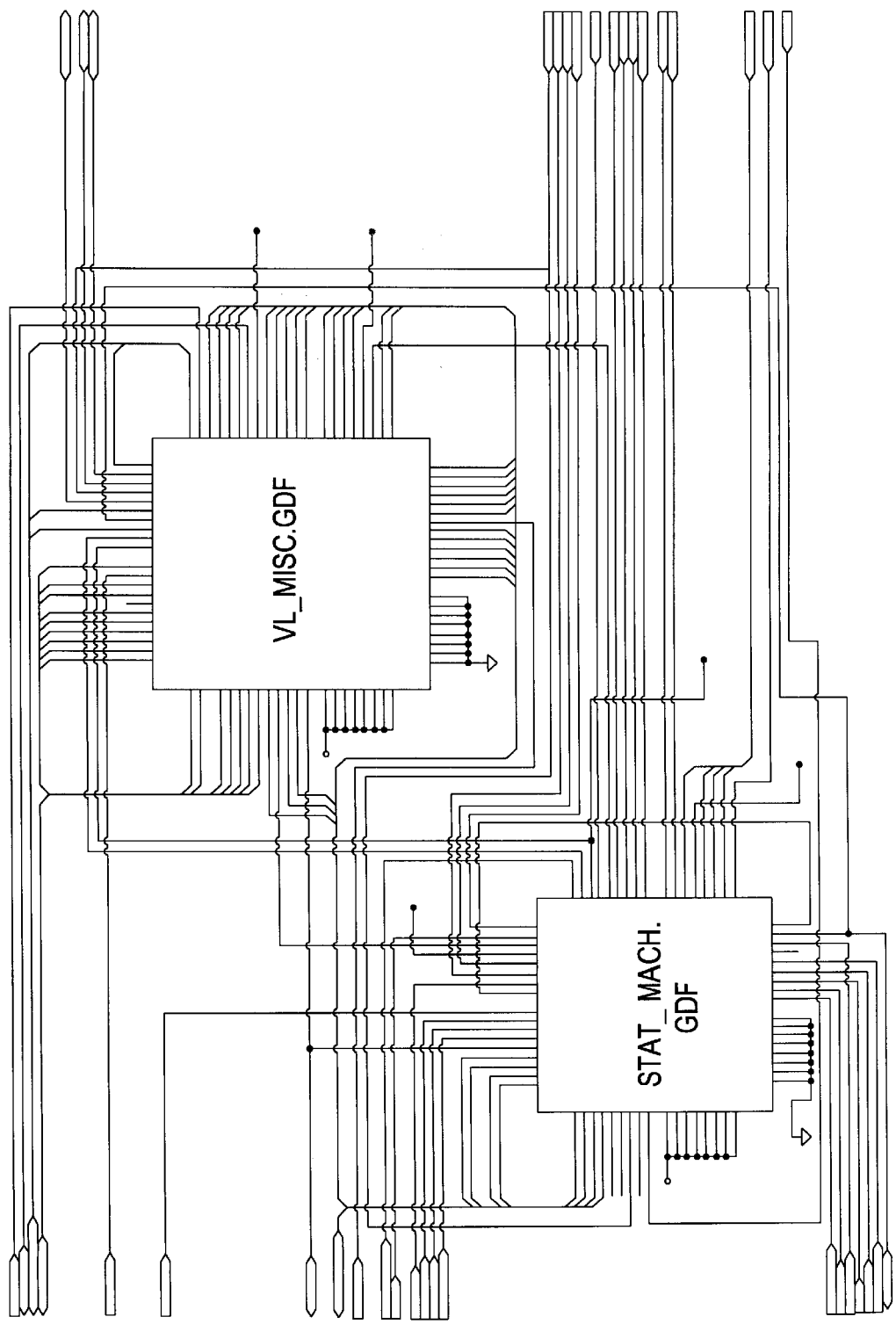
Figure 8:
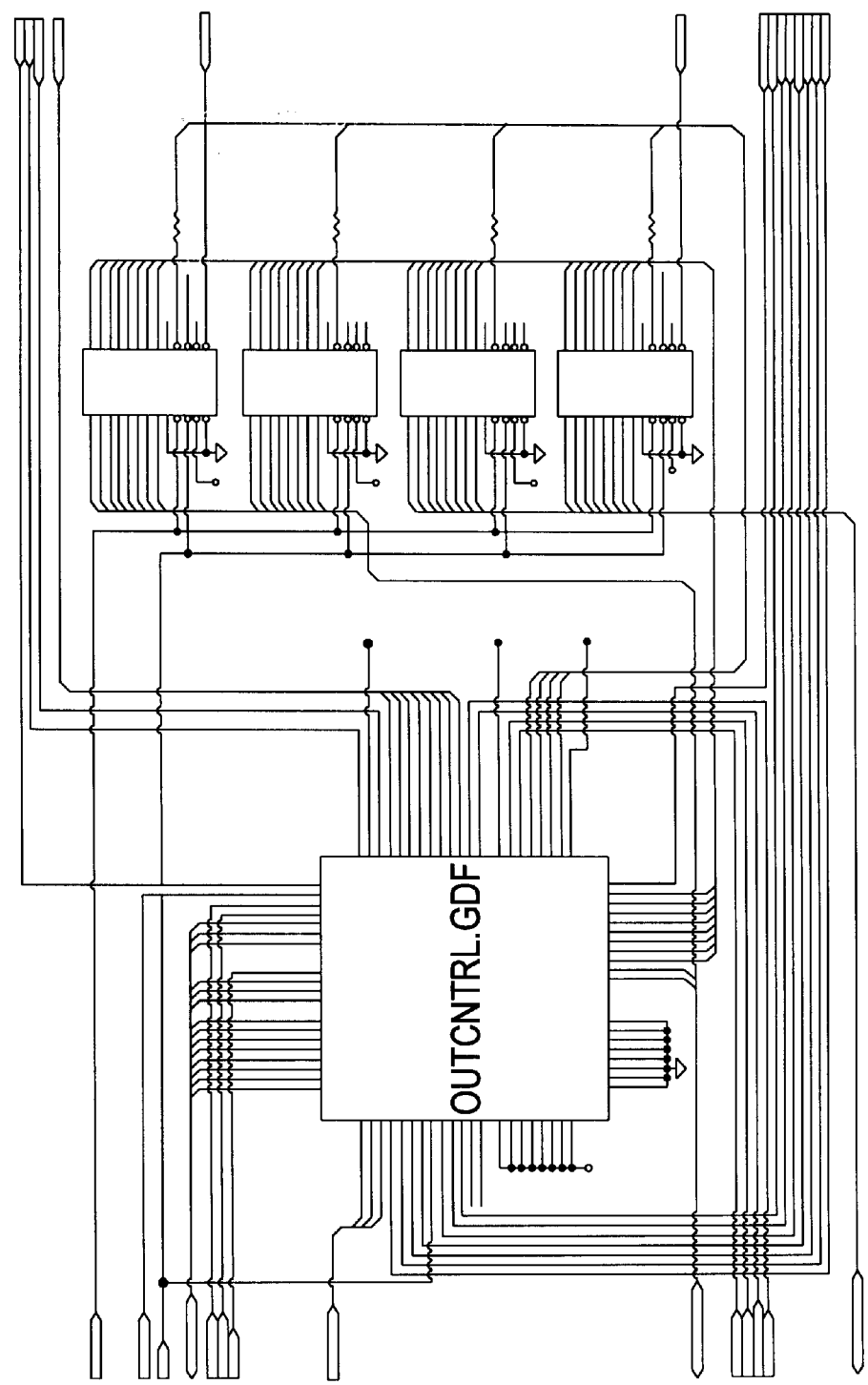
Figure 9:
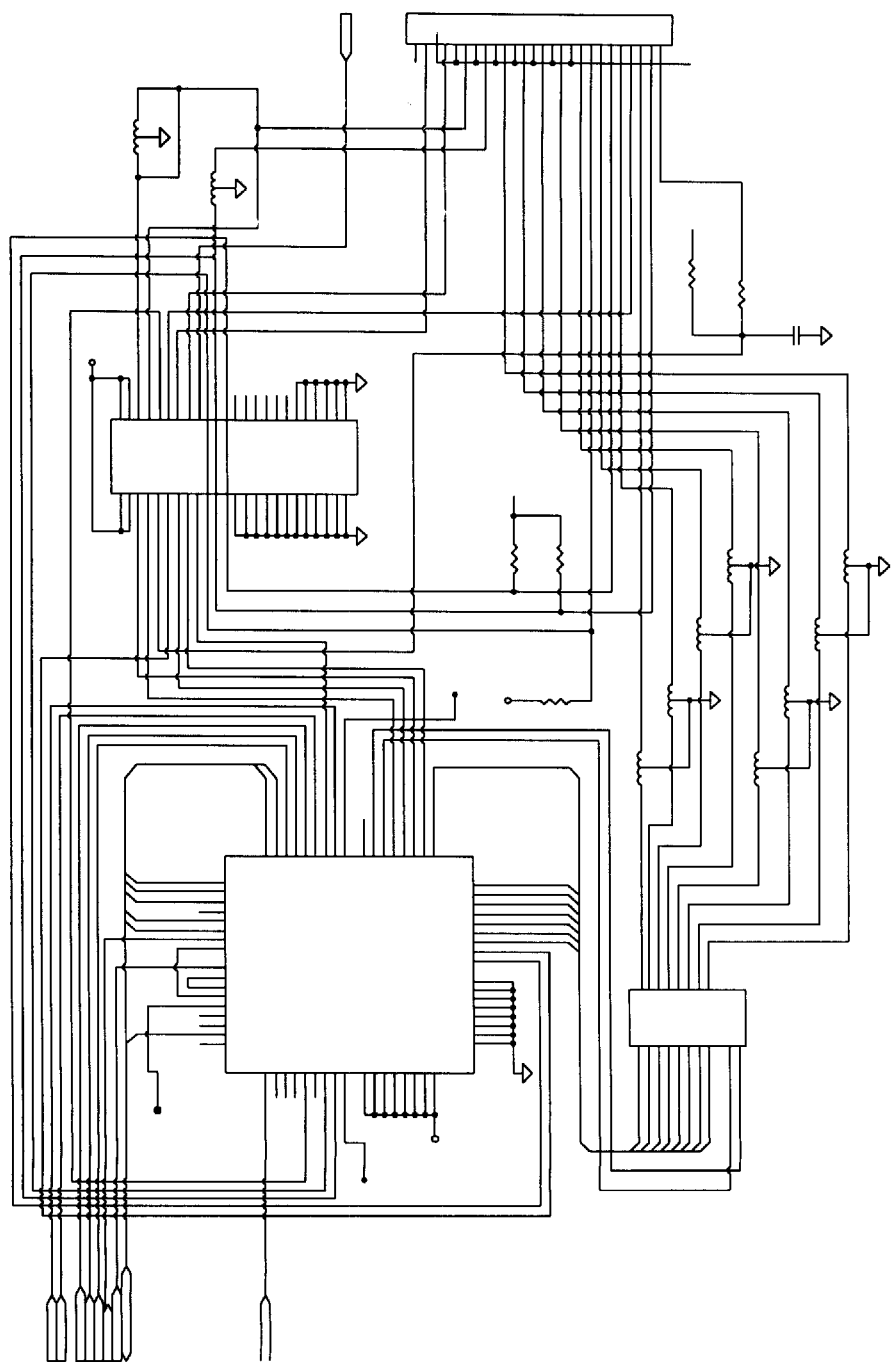
Figure 10:
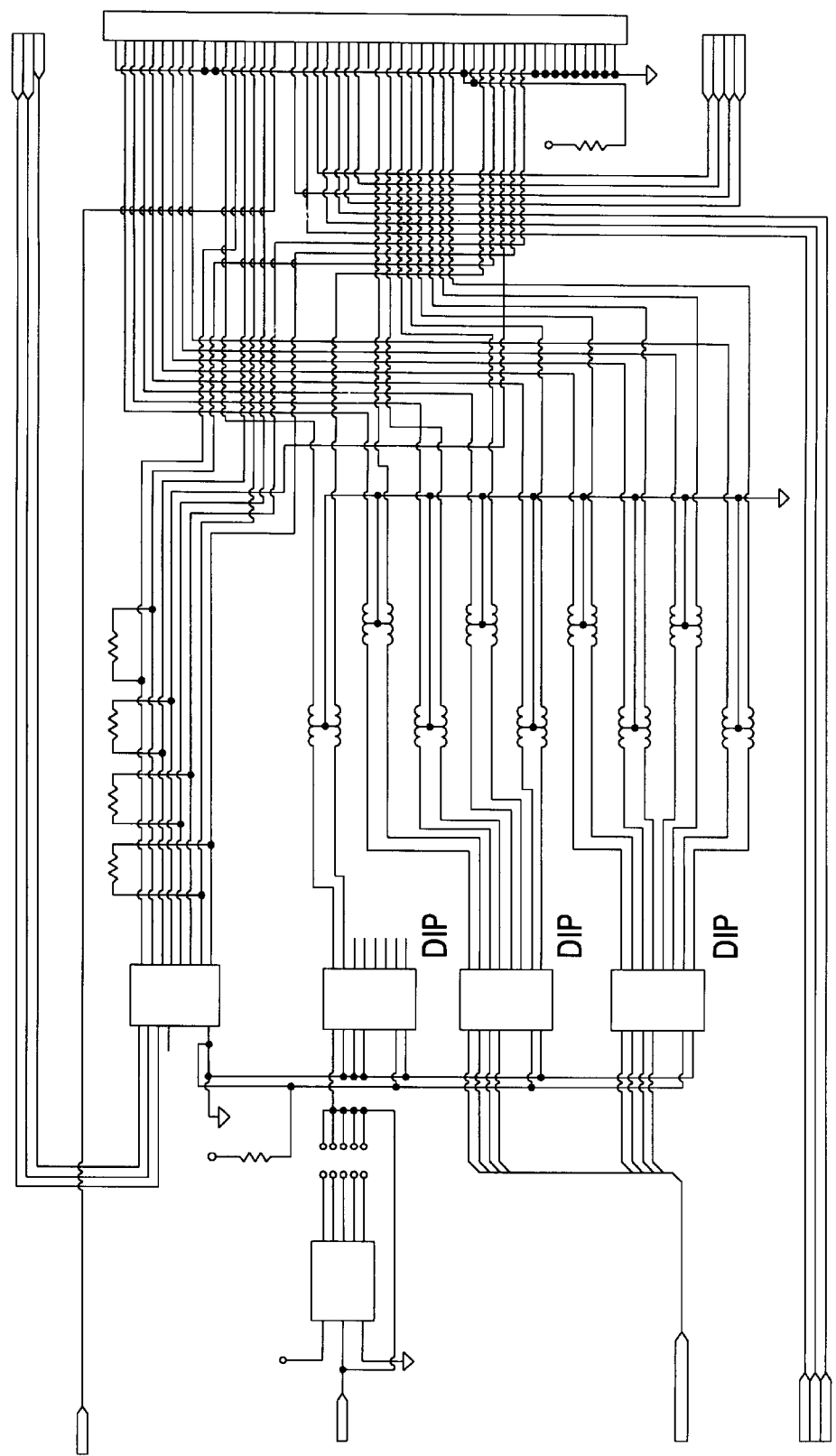
Figure 11:
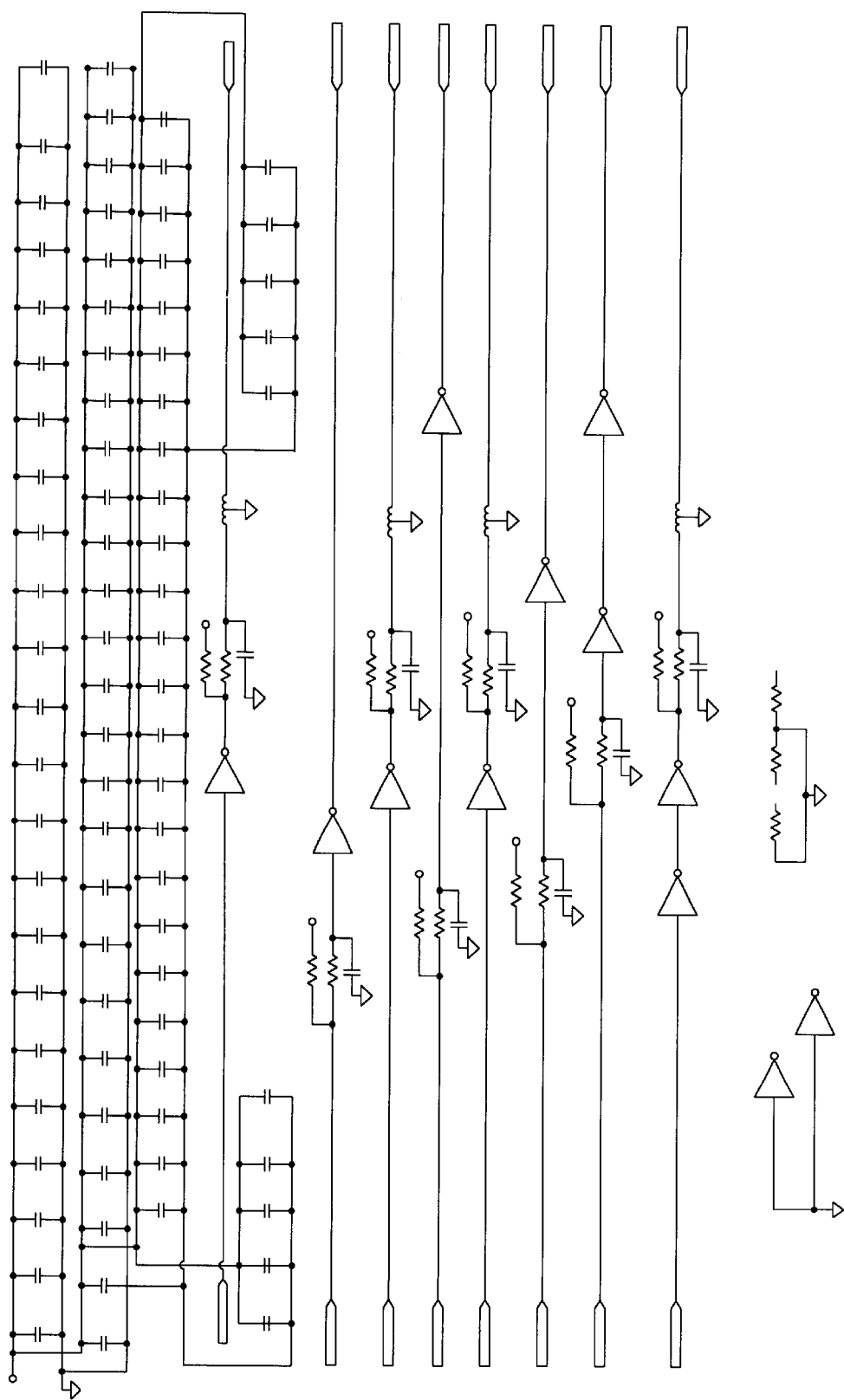

FIG. 3 is a diagram illustrating the flow of data and commands through the controller 20. The data and commands are received at the network card 116, the parallel port 120 and/or the serial port 122. The data and commands (referred to as a print job) are processed by an input/output (I/O) controller 124 implemented by the microprocessor 113 shown in FIG. 2. The I/O controller determines the order which print jobs are to be sent to the image formation device 10. The I/O controller 124 detects the language of the data and commands and routes the data and commands to the appropriate print interpreter. FIG. 3 shows a Printer Control Language (PCL) interpreter 126 and a Postscript interpreter 128. PCL and Postscript are commercially available print languages used in conventional printers. The I/O controller 124 detects which interpreter should be used by checking the initial characters at the beginning of any print job. If the I/O controller 124 cannot determine that the job is meant for a specific language, a default interpreter is selected. The default interpreter can be set via a control panel located on the image formation device 10.

In order for language switching to function correctly, the system must know when the end of job has been reached.

The I/O controller 124 determines end-of-file by detecting certain characters or timing out. If the controller 20 includes the network interface 116, end-of-file signals are generated by the network card 116.

In convention systems, a problem arises in detecting the end-of-file command in binary data streams. This typically entails parsing the data stream to locate an end-of-file command which creates problems in performance and compatibility. Normally, any device connected to a parallel port cannot signal when a transmission has completed as a separate transaction from the transmission of the data itself. Therefore, to detect the end of a transmission, the receiving system must parse or scan the incoming data stream for some data sequence that signals end of transmission. This is sometimes the ASCII code EOT (0×04) also known as Control-D. There are two problems with this method. First, the receiving system must examine every byte of incoming data while scanning for this data sequence. This takes processing cycles and reduces performance. Second, the actual data being transmitted cannot contain the end of transmission sequence without triggering a false end of transmission. There exists a protocol, TBCP (Tagged Binary Control Protocol), that "tags" certain control characters with an "escape" character to allow a data stream to contain data otherwise reserved for flow control. This also falls under the problem described above, and in fact makes it worse since extra processing must be done for same data bytes.

Accordingly, in the present invention, binary data is supported over the network interface 116 or through the parallel port 120, as long as a network interface 116 is included in the controller 20. The network interface 116 generates explicit end-of-file commands and thus the controller can determine when the end of a print job has been reached. The network interface 116 uses a special high speed mode of the parallel port and thus, simultaneous parallel and network operation is not available. The controller 20, when connected to a network interface 116, employs a hardware level signaling method that provides for communication via the parallel port that is separate from the data stream being transmitted. This method is derived from the IEEE 1284 specification for a bi-directional parallel port. During the handshaking phase, the network interface 116 and the controller 20 identify to each other that this signaling protocol is supported. The IEEE 1284 protocol specifies a hardware signaling method for negotiation from one mode of operation to another. The present invention uses the IEEE 1284 "compatibility mode" for normal data transmission, and uses "ECP mode" for "out of band" communication separate from the data transmission. The negotiation from one mode to the other is handled distinctly from the data transmission at the hardware handshaking level. This allows efficient processing since the data bytes do not have to be scanned for end of transmission sequences. It also allows any data to be transmitted without the need to escape certain data sequences.

The PCL interpreter 126 and the Postscript interpreter 128 convert the data received at the controller 20 into pixel data (e.g. a series of pixels having intensity values). In accordance with an important aspect of the invention, the pixel data, and associated commands, are stored in memory 115. The image formation device 10 also includes a memory referred to as an electronic recirculating document handler (E-RDH). The E-RDH located in the image formation device 10 stores images for printing. The memory 115 in the controller 20 allows images to be rasterized and stored by the controller 20 even if the E-RDH in the image formation device 10 is full and the image formation device 10 is busy printing. There is an asynchronous connection between the main CPU 113 and the controller interface 114 which also includes a microprocessor. Accordingly, a double-buffer is achieved in which the memory 115 in the controller 20 allows the print jobs to be rasterized even if the image formation device 10 is not ready to receive new print jobs. The controller interface 114 monitors the image formation device 10 and through handshaking determines when the image formation device 10 is ready to receive new print jobs. This improves the throughput of the system and provides for a printing capacity of 50 pages per minute.

The memory 115 in the controller 20, in the base configuration, contains 16 MB of RAM. This configuration allows 400 DPI 8-bit printing on letter (A4) size paper. 400/600 DPI printing on larger paper and double buffering are available in 1-bit mode. The memory 115 may be upgraded to 128 MB in 16MB increments to allow 8-bit grayscale printing on tabloid (A3) paper or double buffering on smaller paper sizes. Additional memory may also be required for more complex jobs. As described above, the controller 20 rasterizes all of the pages in the print job and stores them to the E-RDH memory. When the end of the job is reached, the pages are printed. While the pages are printed from the E-RDH memory, the controller 20 is free to begin rasterizing the next print job into memory 115. The more memory that the controller 20 has, the more pages it can rasterize while waiting for the previous job to print. This also applies when the controller 20 is waiting for the image formation device 10 to finish being used as a copier.

The pixel data and the commands are transferred from the memory 115 to the controller interface 114 when the controller interface 114 detects that the image formation device 10 is ready to receive additional print jobs. In accordance with yet another important feature of the present invention, the controller 20 can designate several printer functions. As previously described, the controller 20 receives both data and commands. The commands are used by the controller 20 to control print functions performed by the image formation device 10. The controller interface 114 receives the commands and provides control signals to the image formation device 10 to implement print functions.

A variety of print functions can be designated by the controller 20 when the image formation device 10 is operating in printer mode. This allows a user to designate complex printing functions without having to walk to the image formation device 10 and designate the required function. The controller 20 can select a variety of basic functions that users of copiers are familiar with including paper size, paper tray, resolution, orientation, number of copies, paper type (normal, OHP, thick, thin), print quality (very high, high, medium, text), duplex (off, long-edge, short-edge), finisher mode, staple location (off, single, double (Top), double (Left)), output tray, special modes (normal, 2-in-1, booklet, letterhead, front & back covers, separator page, special tray), configuration of the installed memory and identification of the finisher installed. Certain ones of these functions are designated using the commercially available PJL language that control many printer functions. The controller 20 includes default settings installed by the manufacturer which may be updated by the user through the control panel on the image formation device 10.

The print quality mode designates how many bits are assigned to each pixel in the printed image. Since all pages of a print job are stored in the E-RDH memory in the image formation device 10 before printing, the E-RDH can control the manner in which the images are printed. The E-RDH has several modes of operation which affect the output quality and the number of pages that can fit in E-RDH memory. In very high quality mode the E-RDH in is placed in through mode in which 8-bit/pixel data is delivered directly from the controller 20 to the image formation device 10 for printing. This is true grayscale printing. In high quality mode, the controller 20 provides 8 bit/pixel data to the image formation device 10 which performs error diffusion compression using 4 bits/pixel. In medium quality mode, the controller 20 provides 8 bit/pixel data to the image formation device 10 which performs error diffusion compression using 2 bits/ pixel. Lastly, in text mode the controller 20 only generates 1 bit/pixel. The image formation device 10 receives the one bit/pixel data, compresses it and stores it in the E-RDH.

FIGS. 4–11 are schematic diagrams of the controller interface 114. As previously described, the controller interface 114 communicates with the image formation device 10 to determine the status of the image formation device 10. When the image formation device 10 is ready to receive additional print jobs, the controller interface 114 forwards the pixel data from the memory 115 to the image formation device 10. The controller interface 114 also provides control commands to the image formation device 10 such as paper size, image quality, etc. In accordance with yet another important aspect of the invention, the controller interface 114 includes flash memory 410 shown in FIG. 4. The flash memory 410 allows the controller interface 114 to be reprogrammed in the field via floppy disk. The controller interface 114 has circuitry that allows flash memory 410 to be reprogrammed by sending commands and data via a VL bus connector. This circuitry may function even if the existing firmware on the flash memory 410 is corrupted. The advantages to this system include cost savings and ease of access since memory chips do not have to be programmed and replaced in order to update the system firmware. End users may perform the reprogramming by utilizing a specially prepared industry standard floppy disk, obviating the need for a technician to perform this task.

The controller of the present invention receives print jobs from users and forwards the print jobs to an image formation device. The controller includes a memory for buffering pixel data and thereby enhancing the throughput of the image formation system. The controller also receives commands and controls the image formation device to implement certain functions. This allows the user to select a variety of image formation device functions without being physically present at the image formation device.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A controller for use with an image formation device having an internal image formation device memory, the controller receiving print jobs and providing the print jobs to the image formation device, the controller comprising:

at least one input port for receiving the print job;

an I/O controller for detecting a language of the print job;

at least one interpreter for converting the print job to pixel data based on the language detected by said I/O controller;

a memory for storing the pixel data; and a controller interface for monitoring capacity of the internal image formation device memory and providing the pixel data from said memory to the internal image formation device memory when the image formation device is ready to receive additional pixel data.

2. The controller of claim 1 wherein said print job comprises data and commands and said controller controls functions of the image formation device based on said commands.

3. The controller of claim 1 wherein said at least one input port comprises a parallel port and a network interface, said network interface generating an end-of-file signal when a print job received at said parallel port is finished.

4. The controller of claim 1 wherein said controller interface includes a reprogrammable memory.

5. The controller of claim 1 wherein said controller has a conventional, open architecture.

6. The controller of claim 5 wherein said conventional, open architecture is a personal computer architecture.

7. The controller of claim 6 wherein said personal computer architecture includes a motherboard having at least one connection slot and said controller interface is mounted in said connection slot.

8. The controller of claim 3 wherein said personal computer architecture includes a motherboard having at least one connection slot and said network interface is mounted in said connection slot.

9. The controller of claim 1 further comprising a main microprocessor having an asynchronous connection with said controller interface.

10. A method of controlling an image formation device having an internal image formation device memory, the method comprising:

receiving a print job;

detecting a language of the print job;

converting the print job to pixel data based on the language detected by said I/O controller;

storing the pixel data; and monitoring the capacity of the internal image formation device memory and providing the pixel data to the internal image formation device memory when the image formation device is ready to receive additional pixel data.

* * * * *